United States Patent
Ginsberg et al.

(10) Patent No.: US 10,244,374 B2
(45) Date of Patent: Mar. 26, 2019

(54) SERVICE TOOL PROXIMITY DETECTION

(71) Applicant: OTIS ELEVATOR COMPANY, Farmington, CT (US)

(72) Inventors: David Ginsberg, Granby, CT (US); Mark Olthuis, Avon, CT (US); Fred G. Williams, Old Saybrook, CT (US); Jody Phouthavong, Stratford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/651,415

(22) Filed: Jul. 17, 2017

(65) Prior Publication Data
US 2019/0020971 A1 Jan. 17, 2019

(51) Int. Cl.
*H04W 4/80* (2018.01)
*H04W 12/06* (2009.01)
(Continued)

(52) U.S. Cl.
CPC ............ *H04W 4/80* (2018.02); *B66B 1/3461* (2013.01); *H04L 67/34* (2013.01); *H04W 4/023* (2013.01); *H04W 12/06* (2013.01)

(58) Field of Classification Search
CPC ..................................................... H04W 4/008
(Continued)

(56) References Cited

U.S. PATENT DOCUMENTS 6,571,103 B1 * 5/2003 Novakov ............... H04L 29/06
455/464
7,426,981 B2 9/2008 Bacellar et al.
(Continued)

FOREIGN PATENT DOCUMENTS

EP 2671836 2/2011
EP 1750573 4/2011
(Continued)

OTHER PUBLICATIONS

Dexdyne "Remote Life & Elevator Monitoring Solution" Jan. 3, 2015, 2 pages.
(Continued)

*Primary Examiner* — Wen W Huang
(74) *Attorney, Agent, or Firm* — Cantor Colburn LLP

(57) ABSTRACT

A service tool proximity detection system includes a service tool and an equipment controller. The service tool is operable to establish communication with the equipment controller of an equipment service system. At least one processor of the service tool proximity detection system is configured to generate a location proximity indicator to verify proximity of the service tool to a predetermined service location of the equipment service system, determine that the service tool is located local to the predetermined service location based on verifying that a response to the location proximity indicator matches an expected response, determine that the service tool is located remote from the predetermined service location based on verifying that the response to the location proximity indicator fails to match the expected response, and configure one or more functions of the service tool based on the location of the service tool relative to the predetermined service location.

20 Claims, 4 Drawing Sheets

(51) Int. Cl.
*B66B 1/34* (2006.01)
*H04L 29/08* (2006.01)
*H04W 4/02* (2018.01)

(58) Field of Classification Search
USPC .................................. 455/41.1, 41.2, 41.3
See application file for complete search history.

(56) References Cited

U.S. PATENT DOCUMENTS

| | | | |
|---|---|---|---|
| 7,699,143 B2 | 4/2010 | Tschuemperlin et al. | |
| 8,028,807 B2 | 10/2011 | Deplazes et al. | |
| 8,145,199 B2 | 3/2012 | Tadayon et al. | |
| 8,651,242 B2 | 2/2014 | Sarjanen | |
| 8,712,686 B2 | 4/2014 | Bandyopadhyay et al. | |
| 8,813,917 B2 | 8/2014 | Salmikuukka et al. | |
| 8,937,534 B2 | 1/2015 | Kreiner et al. | |
| 9,110,159 B2 | 8/2015 | Vartanian et al. | |
| 9,391,782 B1 * | 7/2016 | Mironenko | H04L 9/3247 |
| 9,403,663 B2 | 8/2016 | Dellarippa et al. | |
| 9,485,628 B2 | 11/2016 | Lee et al. | |
| 9,497,311 B2 | 11/2016 | Salmenkaita et al. | |
| 9,541,905 B2 | 1/2017 | Nixon et al. | |
| 9,592,993 B2 | 3/2017 | Joyce et al. | |
| 9,626,647 B2 | 4/2017 | Pierce et al. | |
| 2003/0043073 A1 | 3/2003 | Gray et al. | |
| 2004/0176958 A1 | 9/2004 | Salmenkaita et al. | |
| 2006/0144646 A1 | 7/2006 | Engel et al. | |
| 2007/0001904 A1 | 1/2007 | Mendelson | |
| 2011/0151963 A1 | 5/2011 | Prehofer | |
| 2011/0218730 A1 * | 9/2011 | Rider | G01C 21/00 701/533 |
| 2013/0045685 A1 * | 2/2013 | Kiani | G06F 19/3406 455/41.2 |
| 2013/0244615 A1 * | 9/2013 | Miller | H04W 12/06 455/411 |
| 2013/0246928 A1 * | 9/2013 | Hovi | B66B 5/0025 715/738 |
| 2014/0069745 A1 * | 3/2014 | Dellarippa | B66B 1/34 187/381 |
| 2015/0089607 A1 | 3/2015 | Hubner et al. | |
| 2015/0235489 A1 * | 8/2015 | Vardi | G07C 9/00007 340/5.6 |
| 2015/0251875 A1 * | 9/2015 | Lustenberger | B66B 5/0031 700/275 |
| 2015/0274214 A1 | 10/2015 | Park et al. | |
| 2015/0284214 A1 | 10/2015 | Park et al. | |
| 2016/0004871 A1 | 1/2016 | Guedalia et al. | |
| 2016/0134686 A1 | 5/2016 | Youker et al. | |
| 2016/0207735 A1 * | 7/2016 | Elomaa | B66B 1/2458 |
| 2016/0212147 A1 | 7/2016 | Palin et al. | |
| 2017/0013409 A1 | 1/2017 | Cerchio et al. | |
| 2017/0230378 A1 * | 8/2017 | Bliss | H04L 63/105 |

FOREIGN PATENT DOCUMENTS

| | | |
|---|---|---|
| EP | 3128382 | 2/2017 |
| JP | 6013270 | 12/2014 |
| KR | 20130087254 | 8/2013 |
| WO | 2017112659 | 6/2017 |

OTHER PUBLICATIONS

E. Costa-Montenegro, et al., "QR-Maps: an Efficient Tool for Indoor User Location Based on QR-Codes and Google Maps," The 8th Annual IEEE Consumer Communications & Networking Conf, Jan. 2011, 5 pages.

V. Vasudevan, Glassbeam "Remote maintenance of escalators and elevators using log analytics" Feb. 27, 2015, 3 pages.

Y. Lin, et al., "A Simulatin Model for Field Service With Condition-Based Maintenance," Proceedings of the 2002 Winter Simulation Conference, Dec. 2002, 6 pages.

EP Application No. 18184055.4 Extended EP Search Report dated Sep. 21, 2018, 7 pages.

EP Application No. 18184053.9 Extended EP Search Report dated Nov. 7, 2018, 7 pages.

* cited by examiner

SERVICE TOOL PROXIMITY DETECTION

BACKGROUND

The present disclosure relates to equipment service systems, and more particularly, to service tool equipment service systems.

Current service tools used for accessing equipment controllers (e.g., elevator controllers) typically rely on using a separate hardware tool that physically plugs into an equipment control system. The physical connection ensures that the service tool is used by an individual who is physically present at a specific location when using the service tool. Being physically present helps to ensure that a user of the service tool can observe environmental conditions, such as the presence of other people. As networked/wireless service tools are used in place of physically connected service tools, the service tools may not need to be physically present at the location of the equipment. Knowledge of the service tool proximity to one or more specific locations of an equipment service system can be useful for authentication and other factors.

BRIEF DESCRIPTION

According to some embodiments, a service tool proximity detection system is provided. The service tool proximity detection system includes a service tool and an equipment controller. The service tool is operable to establish communication with the equipment controller of an equipment service system. The equipment controller is operable to control one or more equipment components. At least one processor of the service tool proximity detection system is configured to generate a location proximity indicator to verify proximity of the service tool to a predetermined service location of the equipment service system, determine that the service tool is located local to the predetermined service location based on verifying that a response to the location proximity indicator matches an expected response, determine that the service tool is located remote from the predetermined service location based on verifying that the response to the location proximity indicator fails to match the expected response, and configure one or more functions of the service tool based on the location of the service tool relative to the predetermined service location.

In addition to one or more of the features described above or below, or as an alternative, further embodiments may include where the location proximity indicator comprises a sequence to be entered through a user interface.

In addition to one or more of the features described above or below, or as an alternative, further embodiments may include where the location proximity indicator includes a code to be captured as image data.

In addition to one or more of the features described above or below, or as an alternative, further embodiments may include where the equipment controller generates the location proximity indicator as a code to be entered through the service tool.

In addition to one or more of the features described above or below, or as an alternative, further embodiments may include where the location proximity indicator includes an audio code to be captured as audio data.

In addition to one or more of the features described above or below, or as an alternative, further embodiments may include where the location proximity indicator comprises an audio prompt to elicit the expected response through a user interface.

In addition to one or more of the features described above or below, or as an alternative, further embodiments may include where the location proximity indicator includes an audio prompt to elicit the expected response through a user interface.

In addition to one or more of the features described above or below, or as an alternative, further embodiments may include where the service tool and the equipment controller establish communication using a local-only wireless link.

In addition to one or more of the features described above or below, or as an alternative, further embodiments may include where the service tool and the equipment controller exchange location information.

In addition to one or more of the features described above or below, or as an alternative, further embodiments may include where the service tool is determined to be located remote to from the predetermined service location based on an absence of the response to the location proximity indicator within a predetermined timeout period.

In addition to one or more of the features described above or below, or as an alternative, further embodiments may include where the equipment controller is an elevator controller, and the one or more equipment components include one or more elevator components.

According to some embodiments, a method of service tool proximity detection is provided. The method includes generating a location proximity indicator to verify proximity of a service tool to a predetermined service location of an equipment service system comprising an equipment controller operable to control one or more equipment components. The method also includes determining that the service tool is located local to the predetermined service location based on verifying that a response to the location proximity indicator matches an expected response, determining that the service tool is located remote to from the predetermined service location based on verifying that the response to the location proximity indicator fails to match the expected response, and configuring one or more functions of the service tool based on the location of the service tool relative to the predetermined service location.

Technical effects of embodiments of the present disclosure include establishing relative proximity of a service tool to one or more predetermined service locations of an equipment service system.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

A detailed description of one or more embodiments of the disclosed apparatus and method are presented herein by way of exemplification and not limitation with reference to the Figures.

Figure 1:
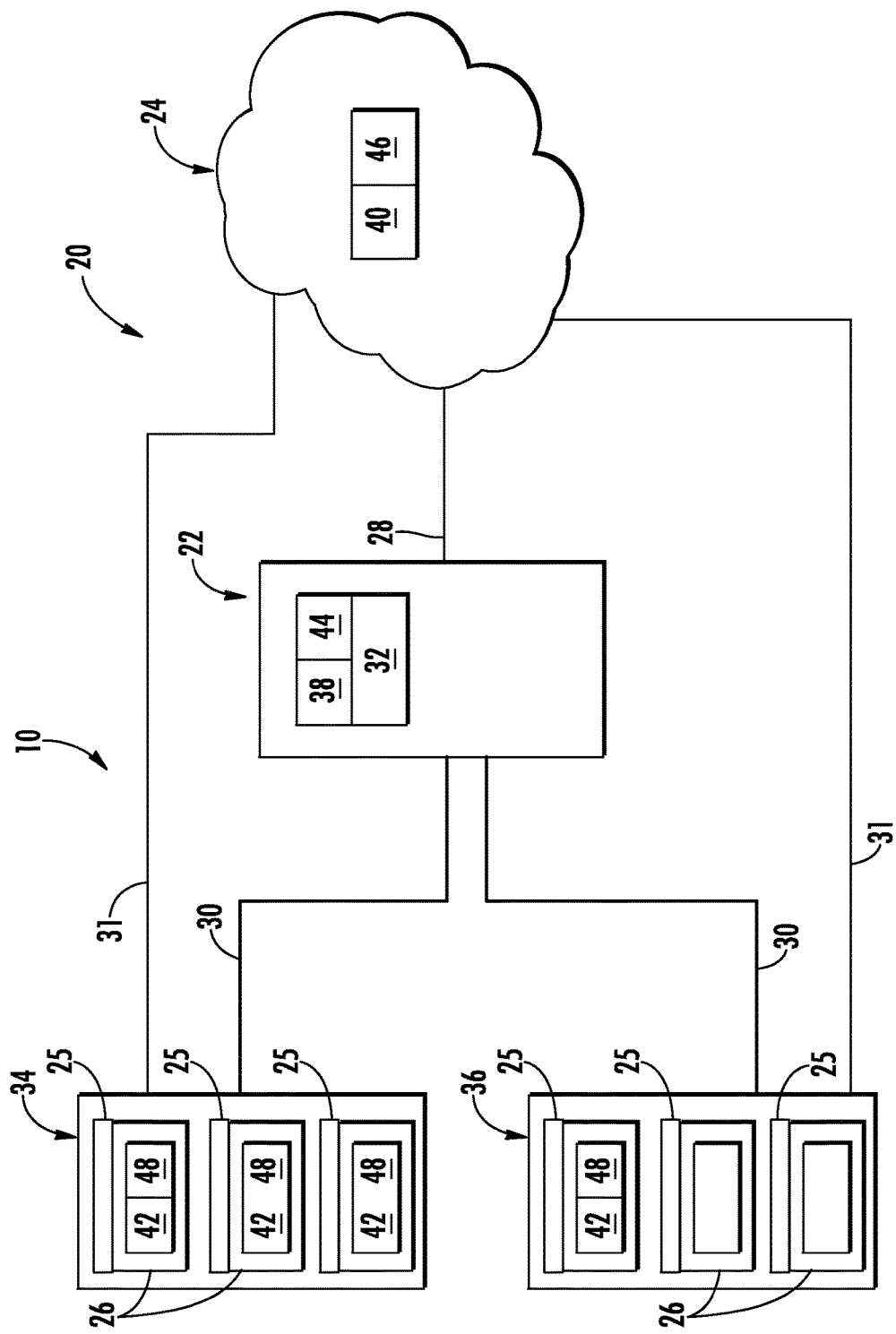
FIG. 1 is a schematic illustration of an equipment service system as one, non-limiting, exemplary embodiment of the present disclosure.

Referring to FIG. 1, an exemplary embodiment of an equipment service system 20, which may include, or may use portions of, a service tool 22, a remote server 24, and at least one equipment controller 26. The service tool 22 may communicate with the remote server 24 and/or the equipment controller 26 over respective communication pathways 28, 30. The communication pathways 28, 30 may be associated with such communication protocols as Bluetooth®, Wi-Fi, Near Field Communications (NFC), infrared, mobile broadband (e.g., 3G, 4G, etc.), satellite and others. The remote server 24 can facilitate communication between the equipment controller 26 and the service tool 22. One or more communication pathways 31 between the remote server 24 and equipment controller 26 can enable remote access, for instance, when the service tool 22 is unable to establish communication pathway 30. Thus, information can flow over communication pathways 28 and 31, or a direct link can be established between the equipment controller 26 and the service tool 22 using communication pathway 30. Communication pathway 31 can use a different protocol for longer distance secure communication than protocols used by communication pathways 28 and 30, for example.

The service tool 22 may include a user interface 32 that facilitates system interaction with a user (e.g., an equipment repairperson/service technician). Non-limiting examples of the service tool 22 may include a smartphone, a tablet computer, laptop computer, and other electronic devices. The remote server 24 may be cloud-based (i.e., in a cloud network environment). The equipment service system 20 generally controls the flow of information between the service tool 22, the remote server 24 and/or the equipment controller 26. In some embodiments, the service tool 22 may provide an interface to one or more remotely executed applications with reduced local code execution. In one embodiment, the remote server 24 and the equipment controller 26 may be owned and/or controlled by a common company.

The equipment service system 20 may further include at least one site (i.e., two illustrated as 34, 36 in FIG. 1). Each site 34, 36 may include at least one equipment controller 26 (i.e., three illustrated for each site 34, 36) operable to control one or more equipment components 25. Non-limiting examples of sites 34, 36 may be a building, a set of floors within a building, a portion of a floor within a building, a collection of buildings, and others. A non-limiting example of an equipment controller 26 may be an elevator controller that can be serviced by the manufacturer of the elevator, and the one or more equipment components 25 can be one or more elevator components. The service tool 22, the remote server 24, and the equipment controller 26 may each include respective processors 38, 40, 42 (e.g., microprocessors), and storage mediums 44, 46, 48 that may be computer writeable and readable.

In the example of FIG. 1, a service tool proximity detection system 10 can include the service tool 22 and the equipment controller 26, where various proximity verification operations can be distributed between either or both of the service tool 22 and the equipment controller 26. For example, at least one processor 38 of the service tool 22 can generate a location proximity indicator to verify proximity of the service tool 22 to a predetermined service location of the equipment service system 20 and/or at least one processor 42 of the equipment controller 26 can generate the location proximity indicator. The location proximity indicator can be encoded in different forms such as characters, numbers, symbols, light patterns, images, audio, and the like to determine whether the service tool 22 is located local to the predetermined service location based on verifying that a response to the location proximity indicator matches an expected response. The predetermined service location can be defined in terms of being "local" or "remote", e.g., at one of the sites 34, 36 or not at one of the sites 34, 36. For instance, if the service tool 22 is locally at site 34, then the service tool 22 may be considered remote from site 36. "Local" can be defined being on-site (e.g., within a building) or proximate to a predetermined location depending upon the technology used, such as a location where the location proximity indicator can be seen, heard, or otherwise observed. For instance, when proximity detection requires physical interaction or direct audio/visual confirmation, then "local" is defined as being at a location where such interactions are detectable. If a wider area of coverage is provided for proximity detection, such as a Wi-Fi connection, then "local" can be defined as being within signal communication range for direct wireless communication. "Remote" can be defined as an off-site location or out of range for verifying proximity, such as outside of a range of direct physical interaction, audio/visual detection, and/or beyond a transmission range. The service tool 22 can also have various locations within the "local" category, which may further refine the location. For example, the service tool 22 may be local to a room within a building but remote from the equipment controller 26 in the same building. In some instances, the service tool 22 may be remote from both sites 34, 36. The remote server 24 can be used to establish remote access to sites 34, 36 and/or provide authentication services.

Figure 2:
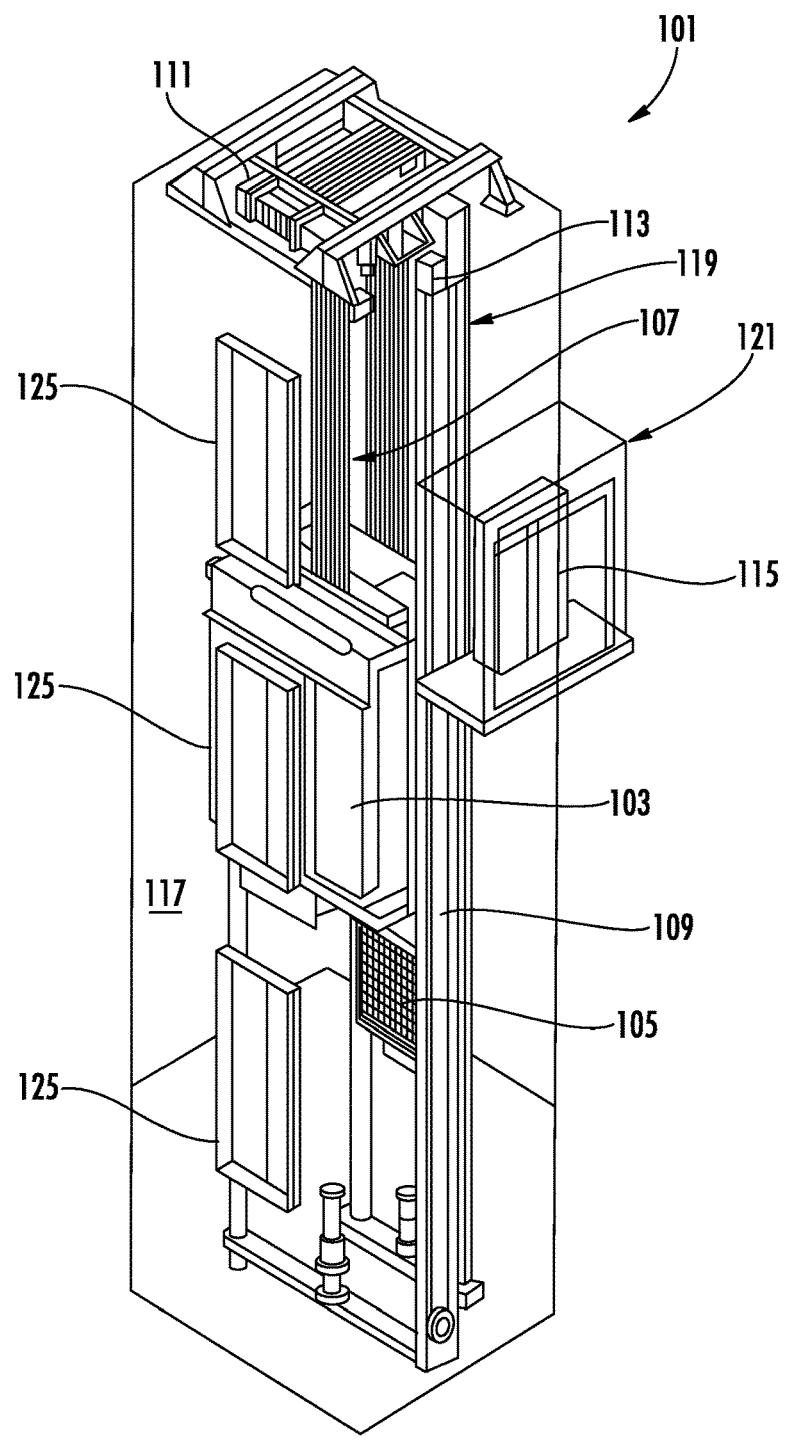
FIG. 2 is a schematic illustration of an elevator system that may employ various embodiments of the present disclosure.

FIG. 2 is a perspective view of an elevator system 101 including an elevator car 103, a counterweight 105, one or more load bearing members 107, a guide rail 109, a machine 111, a position encoder 113, and an elevator controller 115. The elevator system 101 includes examples of various equipment components 25 of FIG. 1 and predetermined service locations 130 (e.g., at various landings 125, within elevator car 103, proximate machine 111, in controller room 121, etc.), where the elevator controller 115 is an example of the equipment controller 26 of FIG. 1. The elevator car 103 and counterweight 105 are connected to each other by the load bearing members 107. The load bearing members 107 may be, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The load bearing members 107 engage the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In some embodiments, the elevator controller 115 can be configured to control features within the elevator car 103, including, but not limited to, lighting, display screens, music, spoken audio words, etc.

The machine 111 may include a motor or similar driving mechanism and an optional braking system. In accordance with embodiments of the disclosure, the machine 111 is configured to include an electrically driven motor. The power supply for the motor may be any power source, including a power grid, which, in combination with other components, is supplied to the motor. Although shown and described with a rope-based load bearing system, elevator systems that employ other methods and mechanisms of moving an elevator car within an elevator shaft, such as hydraulics, ropeless, or any other methods, may employ embodiments of the present disclosure. FIG. 2 is merely a non-limiting example presented for illustrative and explanatory purposes.

Figure 3:
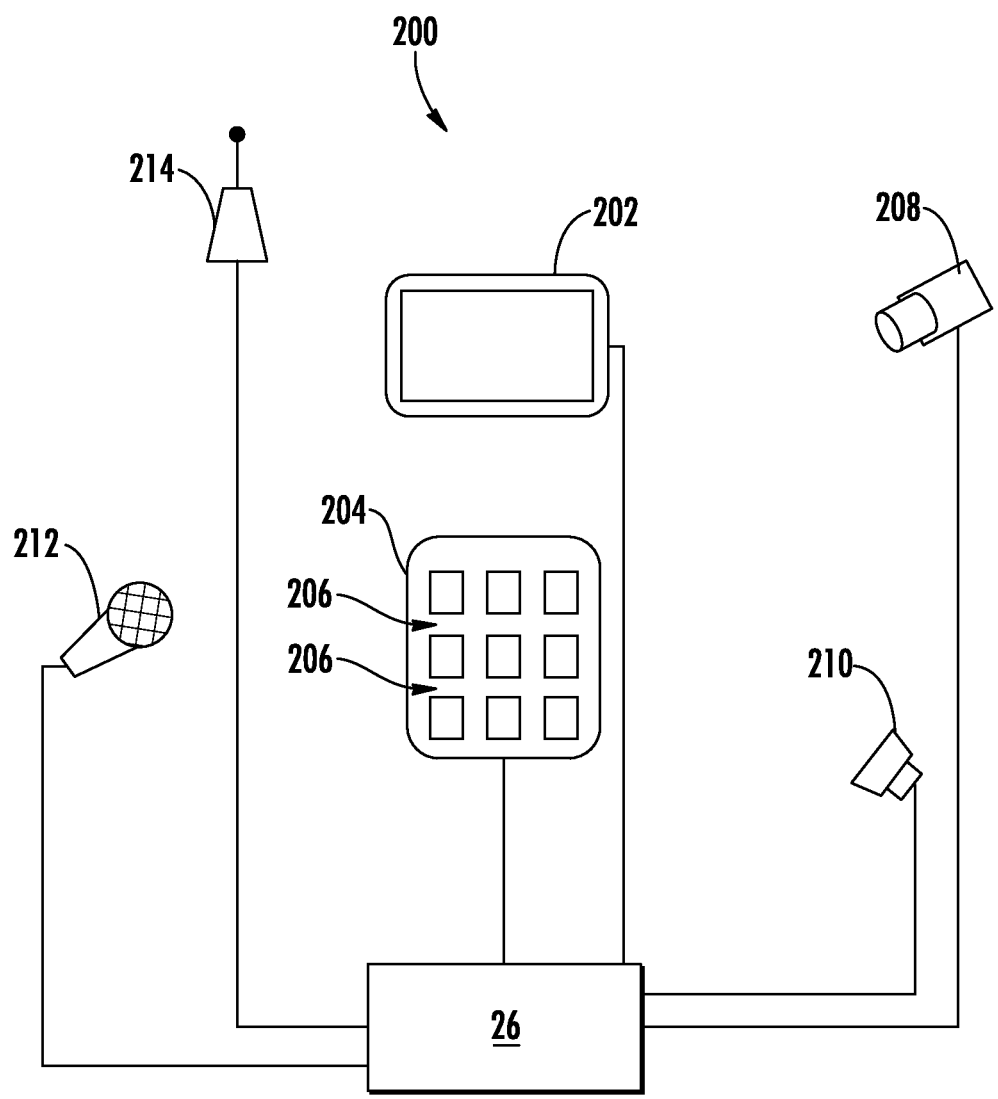
FIG. 3 is a schematic illustration of a user interface of an equipment controller in accordance with an embodiment of the present disclosure.

FIG. 3 depicts an example of user interfaces 200 that can be used to generate a location proximity indicator and/or process a response to the location proximity indicator. One or more instances of the user interfaces 200 can be installed at each site 34, 36 to serve various purposes during normal operation and to support proximity detection and maintenance operations. For instance, the user interfaces 200 can be located in whole or in part within the elevator car 103 of FIG. 2 as part of an elevator control interface. Further, the user interfaces 200 can be located at one or more of the landings 125 of FIG. 2, in controller room 121 of FIG. 2, and/or at other locations. The user interface 32 of the service tool 22 of FIG. 1 can include similar elements as the user interfaces 200 to gather different types of audio/visual inputs and produce different types of audio/visual outputs. The user interfaces 200 can provide various inputs and/or outputs to equipment controller 26 of FIG. 1. For example, the user interfaces 200 can include a display 202, an input interface 204 including a plurality of buttons 206, a camera 208, a speaker 210, and/or a microphone 212. An antenna 214 or other communication interface can be used to establish various types of wireless communication, such as the communication pathway 30 of FIG. 1. In some embodiments, the antenna 214 enables establishment of one or more local-only wireless links with the service tool 22 of FIG. 1. For instance, local-only wireless link protocols such as Bluetooth®, Wi-Fi, or NFC may have a limited communication range such that establishing such a communication channel ensures that the service tool 22 and the location of the user interfaces 200 are in close physical proximity to each other.

The user interfaces 200 can be used to output or receive various types of encoded information as a location proximity indicator. The location proximity indicator can be established as a single code or sequence of codes presented to a user of the service tool 22 of FIG. 1 to confirm that the user of the service tool 22 is physically present at a predetermined location, such as next to the user interfaces 200 of the elevator car 103, landings 125, controller room 121 of FIG. 2, and/or other known location where proximity can be verified through any combination of buttons, touch screen interactions, audio, and/or visual interactions. For instance, a location proximity indicator can be a sequence to be entered through user interface 32 and/or user interface 200, such as a password entered through buttons 206. The sequence may be fixed for a period of time and periodically changed, for instance, a new sequence each day or each week. For example, changed from "1234" to "5624" to "963", etc. The sequence may be determined based on information received from a remote source, such as from the remote server 24 of FIG. 1. In other embodiments, when access to the remote server 24 is unavailable, the sequence can be determined pseudo-randomly using a time-of-day, day-of-year, or other value as a seed for pseudo-random sequence generation. For instance, the equipment controller 26 of FIG. 1 and the service tool 22 of FIG. 1 can use a same sequence generation/authentication function and by applying a same seed value, both produce an expected sequence of symbols to match and confirm physical proximity.

Various methods and combinations of data entry can be used to confirm that the user of the service tool 22 of FIG. 1 is at a predetermined location of the user interface 200 (e.g., within elevator car 103 of FIG. 2) by making visual or audio indicators available and confirming that an expected response to the indicators is received. For example, a sequence of numbers (e.g., floor level indicators) can light up individually or in groups/patterns of buttons 206, and the user of service tool 22 may be prompted to enter the sequence through the service tool 22 or by pressing one or more of the buttons 206 (e.g., observe and enter the sequence) that interface with the equipment controller 26 of FIG. 1. Alternatively, a numerical sequence can be displayed on the user interface 32 to be entered in order through the buttons 206 and/or other input interface 204 readable by the equipment controller 26 of FIG. 1. In some embodiments, the display 202 is touch sensitive and configured to receive touch-based user input. Further, a sequence can be split for partial entry on the user interface 32 and partial entry on the user interface 200. Various images can also be used for proximity verification, such as displaying an image on display 202 and prompting the user of the service tool 22 for one or more identifying image features (e.g., what shape and color appear). Further, bar codes or quick response (QR) codes can be generated as a location proximity indicator provided as a code to be captured as image data through camera 208 and/or a camera of the service tool 22. By prompting with a visual indicator that is human readable or machine readable, whether displayed on a user interface 200 of the site 34, 36 or on the user interface 32 of the service tool 22, the user of the service tool 22 can verify proximity through an expected response or interaction.

As another example, the location proximity indicator can be an audio code to be captured as audio data or an audio prompt to elicit the expected response through user interfaces 32, 200. For instance, a sequence of tones can be output by speaker 210 and captured/recorded using a microphone of the service tool 22. The service tool 22 can playback the tones to microphone 212 or otherwise transmit a copy or summary of the tones to the equipment controller 26, e.g., in an encoded transmission through antenna 214. Further, the audio data can be in the form of a question seeking a user to enter a response through user interfaces 32, 200. In the example of the elevator car 103 of FIG. 2, buttons 206 that are typically used to select a floor can be used as indicators, with the user prompted through the display 202 or speaker 210 within the elevator car 103 to say into the microphone 212 (or otherwise input) how many of the buttons 206 are illuminated or identifying which of the buttons 206 are illuminated. Alternatively, audio or touch-based inputs of the user interface 32 of the service tool 22 can be used to capture a user response indicating how many or which of the buttons 206 are illuminated.

Other examples of information exchanged to establish a location proximity indicator and a corresponding response can include location information determined, for instance, based on internet protocol (IP) address, global positioning system (GPS) coordinates, and the like. Further, for heightened security, two or more forms of location proximity indicator responses may be needed. For example, a combination of audio and visual interactions may be needed to positively determine that an expected response match exists. Further, if no response is received during a timeout period, multiple attempts to convey the location proximity indicator may be made in case damage or other conditions prevent one or more proximity detection techniques from being effective. For example, if speaker 210 is malfunctioning, image data and/or sequences of buttons 206 can be used as a backup proximity detection technique. In some embodiments, the service tool 22 is determined to be located remote of the predetermined service location based on an absence of the response to the location proximity indicator within a predetermined timeout period. Location information can be determined periodically to confirm the current location of the service tool 22. For instance, once proximity is determined as being "local", the service tool 22 may be required to confirm its location every hour or at a different interval until the service tool 22 is determined to be "remote".

Figure 4:
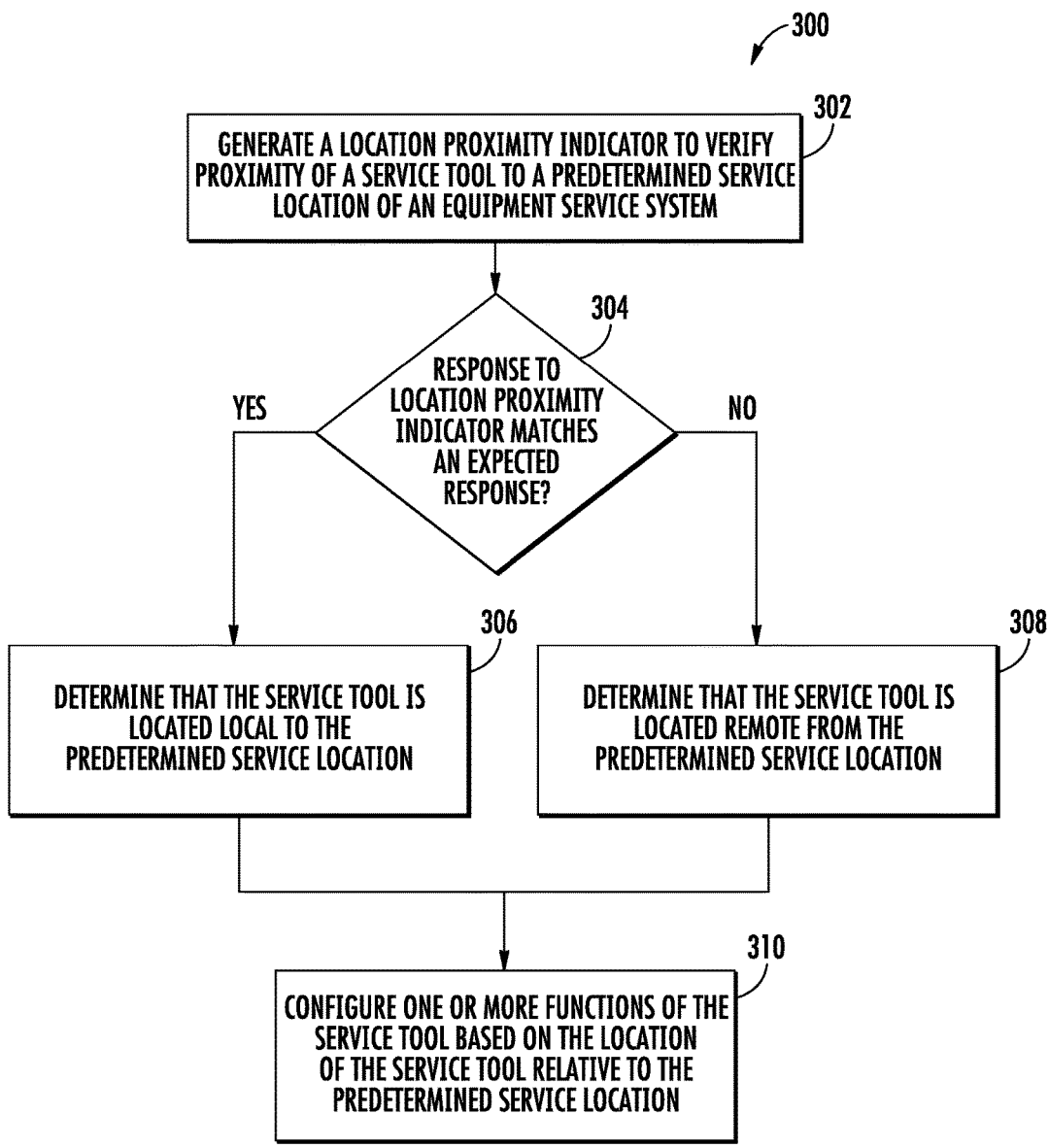
FIG. 4 is a flowchart illustrating a method of service tool proximity detection in accordance with an embodiment of the present disclosure.

FIG. 4 depicts a flow process 300 that can be performed by the service tool proximity detection system 10 of FIG. 1 as shown and described herein and/or by variations thereon. Various aspects of the flow process 300 can be carried out using one or more sensors, one or more processors, and/or one or more machines and/or controllers. For example, some aspects of the flow process involve sensors (e.g., cameras, microphones, etc.), as described above, in communication with a processor or other control device and transmit detection information thereto. The flow process 300 is described in reference to FIGS. 1-4.

At block 302, a location proximity indicator is generated to verify proximity of a service tool 22 to a predetermined service location of an equipment service system 20 that includes an equipment controller 26 operable to control one or more equipment components 25. The location proximity indicator can be a sequence, a code, an audio code, an audio prompt, or other such indicator generated by either or both of the service tool 22 and the equipment controller 26 to verify whether the service tool 22 is at the predetermined service location (e.g., proximate to user interface 200). For example, a location proximity indicator can be generated as a code by the equipment controller 26 to be entered through the service tool 22 or vice versa.

At block 304, one or more components of the equipment service system 20, such as the service tool 22 or the equipment controller 26, can determine whether the service tool 22 is located local to the predetermined service location based on determining whether a response to the location proximity indicator matches an expected response. A randomization pattern can be used to ensure that different values and/or types of the location proximity indicator and expected response are used to increase security by reducing the predictability of the responses with respect to third parties. The definition of "local" can depend upon where the user interfaces 200 are located at site 34, 36 and the type of interaction used to confirm proximity. For instance, a Wi-Fi based interaction can confirm that the service tool 22 is within a transmission radius, e.g., within 300 feet. While interactions that require direct audio or visual confirmation can more precisely confirm that the user of the service tool 22 is physically present at the location of the user interfaces 200 at site 34, 36. When multiple instances of the user interfaces 200 are present at specific locations (e.g., at each floor of a building), the service tool 22 may be local to a specific set of user interfaces 200 while being remote from other instances of the user interfaces 200 at the same site 34, 36.

At block 306, the service tool 22 is determined to be located local to the predetermined service location based on verifying that the response to the location proximity indicator matches the expected response. At block 308, the service tool 22 is determined to be located remote from the predetermined service location based on verifying that the response to the location proximity indicator fails to match the expected response. The service tool 22 may also be determined as located remote from the predetermined service location based on an absence of the response to the location proximity indicator within a predetermined timeout period (e.g., taking greater than two minutes to respond). At block 310, one or more functions of the service tool 22 can be configured based on the location of the service tool 22 relative to the predetermined service location. For instance, control functions of the equipment controller 26 may only be operated while the service tool 22 is considered local to the equipment controller 26; otherwise, the equipment controller 26 may provide monitor-only functions when the service tool 22 is located remote from the equipment controller 26.

In embodiments, the flow process 300 can be periodically performed to confirm whether the proximity status is unchanged, for instance, every N minutes after determining that the service tool 22 is local to the predetermined service location. If the proximity status is detected as transitioning from local to remote such that functionality (e.g., control) of the equipment controller 26 is reduced through the service tool 22, a warning message can be provided prior to disconnecting local service functions. Tasks in progress can be allowed to complete to avoid potential faults associated with partial task completion. Periodic verification of local status can include the use of different confirmation techniques. For instance, while a multi-step proximity confirmation sequence can be used to initially establish proximity, a Wi-Fi or audio based confirmation can be used to confirm that proximity still exists, e.g., to reduce user burden for confirmation.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A service tool proximity detection system comprising:
    a service tool operable to establish communication with an equipment controller of an equipment service system, wherein the equipment controller is an elevator controller; and
    the equipment controller operable to control one or more elevator components, wherein at least one processor of the service tool proximity detection system is configured to:
        generate a location proximity indicator to verify proximity of the service tool to a predetermined service location of the equipment service system;
        determine that the service tool is located local to the predetermined service location based on verifying that a response to the location proximity indicator matches an expected response;
        determine that the service tool is located remote from the predetermined service location based on verifying that the response to the location proximity indicator fails to match the expected response; and
        configure one or more functions of the service tool based on the location of the service tool relative to the predetermined service location.

2. The service tool proximity detection system set forth in claim 1, wherein the location proximity indicator comprises a sequence to be entered through a user interface of an elevator car.

3. The service tool proximity detection system set forth in claim 1, wherein the location proximity indicator comprises a code to be captured as image data.

4. The service tool proximity detection system set forth in claim 1, wherein the equipment controller generates the location proximity indicator as a code to be entered through the service tool.

5. The service tool proximity detection system set forth in claim 1, wherein the location proximity indicator comprises an audio code to be captured as audio data.

6. The service tool proximity detection system set forth in claim 1, wherein the location proximity indicator comprises an audio prompt to elicit the expected response through a user interface.

7. The service tool proximity detection system set forth in claim 1, wherein the service tool and the equipment controller establish communication using a local-only wireless link.

8. The service tool proximity detection system set forth in claim 1, wherein the service tool and the equipment controller exchange location information.

9. The service tool proximity detection system set forth in claim 1, wherein the service tool is determined to be located remote from the predetermined service location based on an absence of the response to the location proximity indicator within a predetermined timeout period.

10. The service tool proximity detection system set forth in claim 1, wherein the location proximity indicator is conveyed through a first type of user interface and based on detecting a malfunction of the first type of user interface or an absence of response within a predetermined timeout period, using a second type of user interface as a backup for proximity detection.

11. A method of service tool proximity detection comprising:
    generating a location proximity indicator to verify proximity of a service tool to a predetermined service location of an equipment service system comprising an equipment controller operable to control one or more equipment components, wherein the equipment controller is an elevator controller and the one or more equipment components comprise one or more elevator components;
    determining that the service tool is located local to the predetermined service location based on verifying that a response to the location proximity indicator matches an expected response;
    determining that the service tool is located remote from the predetermined service location based on verifying that the response to the location proximity indicator fails to match the expected response; and
    configuring one or more functions of the service tool based on the location of the service tool relative to the predetermined service location.

12. The method set forth in claim 11, wherein the location proximity indicator comprises a sequence to be entered through a user interface of an elevator car.

13. The method set forth in claim 11, wherein the location proximity indicator comprises a code to be captured as image data.

14. The method set forth in claim 11, wherein the equipment controller generates the location proximity indicator as a code to be entered through the service tool.

15. The method set forth in claim 11, wherein the location proximity indicator comprises an audio code to be captured as audio data.

16. The method set forth in claim 11, wherein the location proximity indicator comprises an audio prompt to elicit the expected response through a user interface.

17. The method set forth in claim 11, wherein the service tool and the equipment controller establish communication using a local-only wireless link.

18. The method set forth in claim 11, wherein the service tool and the equipment controller exchange location information.

19. The method set forth in claim 11, wherein the service tool is determined to be located remote from the predetermined service location based on an absence of the response to the location proximity indicator within a predetermined timeout period.

20. The method set forth in claim 11, wherein the location proximity indicator is conveyed through a first type of user interface and based on detecting a malfunction of the first type of user interface or an absence of response within a predetermined timeout period, using a second type of user interface as a backup for proximity detection.

* * * * *